United States Patent [19]

Rhea, Jr.

[11] Patent Number: 4,700,491

[45] Date of Patent: Oct. 20, 1987

[54] COLOR-CODED RULER FOR THREE-PHASE WIRING

[76] Inventor: Troy E. Rhea, Jr., 3530 Mark Twain, Memphis, Tenn. 38127

[21] Appl. No.: 828,702

[22] Filed: Feb. 12, 1986

[51] Int. Cl.⁴ .............................................. B43L 7/02
[52] U.S. Cl. .................................................... 33/494
[58] Field of Search ......................... 33/494, 483, 485

[56] References Cited

U.S. PATENT DOCUMENTS

| 1,602,490 | 10/1926 | Homan | 33/494 X |
| 1,608,713 | 11/1926 | Anderson | 33/458 |
| 1,631,731 | 6/1927 | Johnson | 33/483 |
| 2,077,828 | 4/1937 | Dombrowski . | |
| 2,089,209 | 8/1937 | Keuffel et al. . | |
| 2,575,077 | 11/1951 | Snyder . | |
| 2,602,233 | 7/1952 | Iruing . | |
| 2,643,166 | 9/1927 | Martin . | |
| 3,793,732 | 2/1974 | Hamrick . | |

FOREIGN PATENT DOCUMENTS 10220 of 1896 United Kingdom .................. 33/494

Primary Examiner—Harry N. Haroian
Attorney, Agent, or Firm—Dominik, Stein, Saccocio & Reese

[57] ABSTRACT

An electrician's color-coded ruler including sequentially numbered numerals each colored in one of three desired colors corresponding in a repeating pattern to the sequentially numbered poles of a three-phase panelboard.

6 Claims, 3 Drawing Figures

COLOR-CODED RULER FOR THREE-PHASE WIRING

BACKGROUND OF THE INVENTION

1. Field of the Invention

This invention relates generally to wiring aids for electricians. More particularly, this invention relates to an electrician's wiring aid to assist the electrician in the wiring of a three-phase switchboard or panelboard.

2. Description of the Background Art

Presently, switchboards and panelboards provide for the distribution of large blocks of power throughout a building. Switchboards, also commonly referred to as switch gear, are typically freestanding assemblies of switches, fuses and/or circuit breakers which provide switching and feeder protection to a number of feeder circuits connected to a main source, such as incoming electrical power from a power company. Panelboards serve basically the same function as switchboards except on a smaller scale. Namely, panelboards accept a relatively large block of electrical power via a feeder from the switchboard and distributes the power in smaller blocks for final distribution to branch circuits containing the electrical utilization apparatuses and devices such as lighting, motors and appliances. Like switchboards, panelboards comprise main buses to which are connected circuit protective devices (breakers or fuses) which feed the smaller branch circuits.

Typical panelboards comprise main buses which are mounted on an insulating board contained within an enclosing cabinet. Panelboards also include a neutral (ground) bus bar and a grounding bus bar. The conductors of a feeder are electrically connected to the respective bus bars and are typically required to be protected by a main circuit breaker. Each branch circuit is then electrically connected to the respective bus bars by means of a branch circuit breaker. More specifically, a three-phase panelboard typically includes three bus bars (one for each phase), a neutral or ground bus bar, and a grounding bus bar. The mechanical arrangement of the bus bars within the enclosure allows single, double and triple pole circuit breakers to be connected to the bus bars for supplying phase-to-neutral, phase-to-phase and three-phase electrical power to the branch circuit. Furthermore, the mechanical construction of the bus bars forces the circuit breakers to be connected thereto in a staggered configuration to enhance the equalization of the load on each phase.

Present electrical practice dictates certain color schemes for three-phase circuits. In the United States, such practice dictates that phases A, B and C are color coded black, red and blue, respectively, for 120/208 volt three-phase circuits; and, phase A, B and C are color coded brown, orange and yellow, respectively, for 277/480 volt and 240 volt center-tapped delta-connected three-phase circuits. For all voltage circuits, the ground conductor is color coded white and the grounding conductor is color coded green or comprises a bare, non-insulated conductor. Similar color conventions are in practice throughout the entire world; for example, the color scheme in practice in Canada is the same as that of the United States except that the colors for phase A and phase B of the circuits are reversed.

The need for a uniform color scheme is particularly useful when the feeder circuit comprises a four wire 240 volt centered-tapped delta-connected three-phase system in which the middle phase or leg (phase B) actually comprises a higher voltage to ground than the other two phases (phases A and C). Specifically, in a center-tapped 240 volt delta-connected three-phase system, the voltage of phases A and C to ground comprises 120 volts and the voltage between phases is 240 volts, but the voltage of phase B to ground is 208 volts. Hence, it is imperative to use the color scheme as it distinguishes the high phase or leg (phase B) at 208 volts from the 120 phase-to-neutral volts of the other phases (phase A and C). Without a color scheme, the electrician may inadvertently connect a 120 volt lighting or other load to the 208 volt high leg (phase B) of the system thereby imparting damage to the load or creating a safety hazard from an excessive voltage.

In view of the foregoing, the electrician must usually write down the color scheme outlined above on a scrap piece of paper prior to wiring a panelboard so that the electrician may refer to the color scheme during the wiring of the panelboard. Conformance with the color scheme is therefore assured. Hence, the electrician's work may be interrupted several times throughout a typical work day simply to assure conformance to the accepted color scheme.

Therefore, it is an object of this invention to provide an apparatus which overcomes the aforementioned inadequacies of the prior art devices and provides an improvement which is a significant contribution to the advancement of the electrical wiring art.

Another object of this invention is to provide means to increase the productivity of safely wiring a panelboard in conformance with a particular color scheme by eliminating the need of manually writing down the color scheme during the wiring of each panelboard.

Another object of this invention is to provide means for quickly and conveniently indicating to an electrician the color scheme for wiring three-phase panelboards, said means being incorporated in an existing tool commonly used by electricians.

Another object of this invention is to incorporate conventional color schemes for electrical wiring of panelboards with conventional rulers and other measuring devices commonly used by electricians.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a color-coded electrician's ruler having color coded numerals or other color-coded indicia imprinted adjacent to the numerals of the ruler. The colored numerals or other indicia of the color-coded ruler are selected to correspond with the colors used by electricians to identify the three phases (phases A, B and C) of a three-phase electrical power system. Furthermore, the colored numerals or other indicia correspond to the numbered poles of a conventional three-phase panelboard. Thus, to ascertain the proper wiring of a particular numbered pole of a three-phase panelboard, the electrician needs only to unfold the color-coded ruler and view the number, and corresponding color associated therewith, of that particular numbered pole. Additionally, after the panelboard is fully wired, the electrician may quickly double-check the wiring of the panelboard by unfolding the ruler and viewing the numbers on the ruler (and the colors associated therewith) with each conductor wired to each numbered pole of the panelboard. Any discrepancies will, therefore, be quickly revealed, thereby allowing the electrician to correct the wiring and prevent damage to electrical loads or creating a safety hazard.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
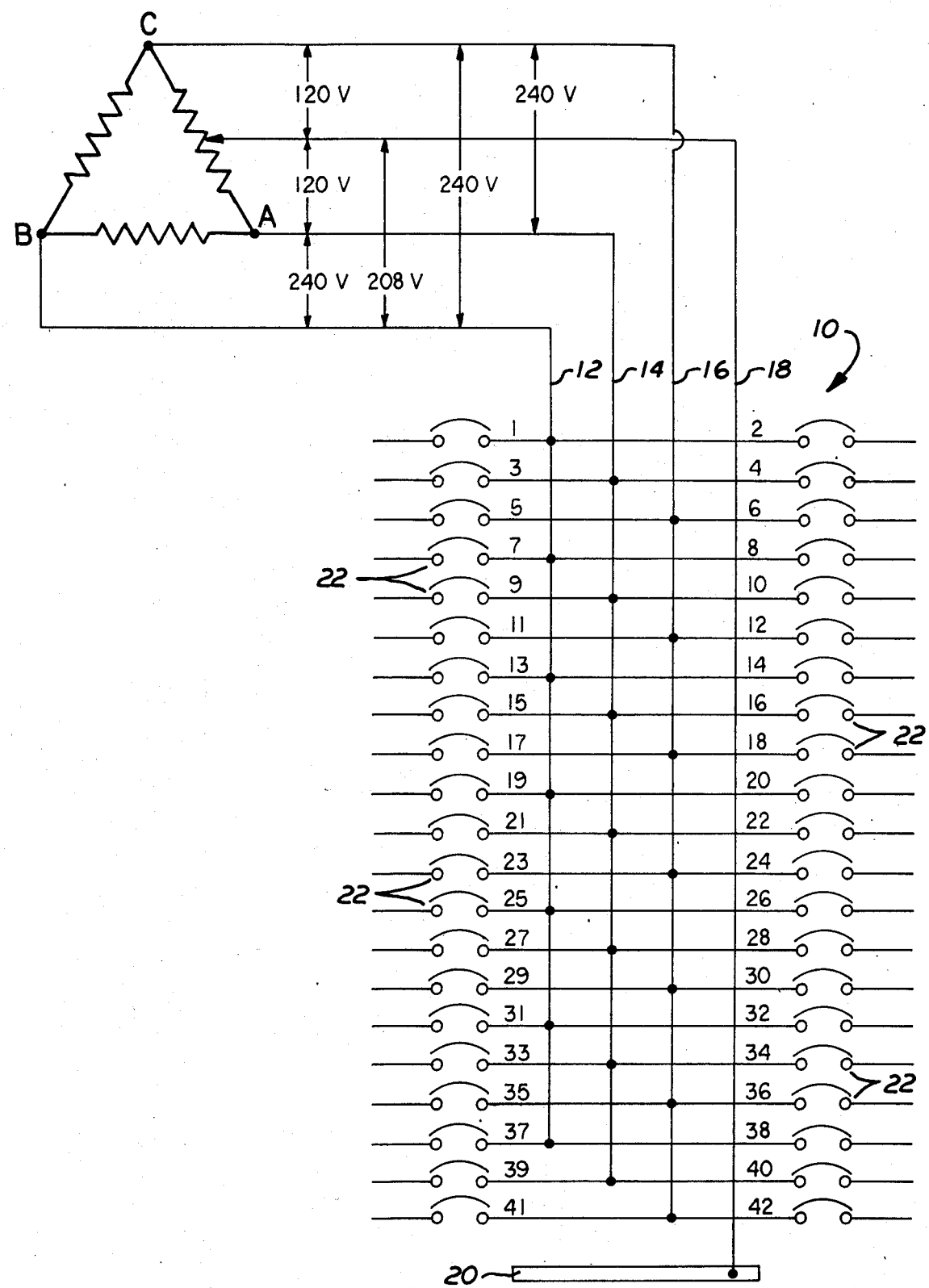
FIG. 1 is a schematic representation of a typically wired conventional three-phase panelboard illustrating the numbered poles of the panelboard and their respective colors.

Referring to FIG. 1, a conventional three-phase panelboard 10 comprises three bus bars 12, 14 and 16, mounted on an insulation board within the cabinet; a neutral (ground) bus bar 18 which is typically grounded to the cabinet of the panelboard 10; and, finally, a grounding bus bar 20 which is rigidly affixed and grounded to the cabinet of the panelboard. In some applications, the grounding bus bar 20 may actually comprise the neutral bus bar itself. A three-phase panelboard 10 of the character outlined above may be used in conjunction with many three-phase power systems such as 120/208Y, 277/480Y volt and 240 center-tapped delta-connected three-phase circuits. For purposes of discussion, FIG. 1 illustrates a three-phase panelboard 10 connected to a 240 volt center-tapped delta-connected three-phase voltage system; however, it shall be understood that the color-coded ruler of the invention as described hereinafter may be used in conjunction with any three-phase panelboard 10 connected to any three-phase voltage system.

A four-wire 240 volt center-tapped delta-connected three-phase power system is schematically illustrated in FIG. 1 as typically connected to a conventional three-phase panelboard 10. In this regard, it is noted that the second phase (phase B) has a phase-to-ground voltage of 208 volts as compared to the 120 phase-to-neutral voltage of the other two phases (phase A and C). Hence, phase B is commonly referred to as the "high leg" and, in many jurisdictions in the United States, is required to be color coded orange for 240 volt delta-connected systems and for 480Y/277 volt systems and to be color coded red for 208Y/120 volt systems. Furthermore, phases A and C are typically color coded brown and yellow, respectively, on the higher voltage power systems and black and blue, respectively, on the lower voltage power systems. Consequently, it is common practice for electricians to wire a three-phase panelboard in the color-coded configuration illustrated in FIG. 1.

Figure 2:
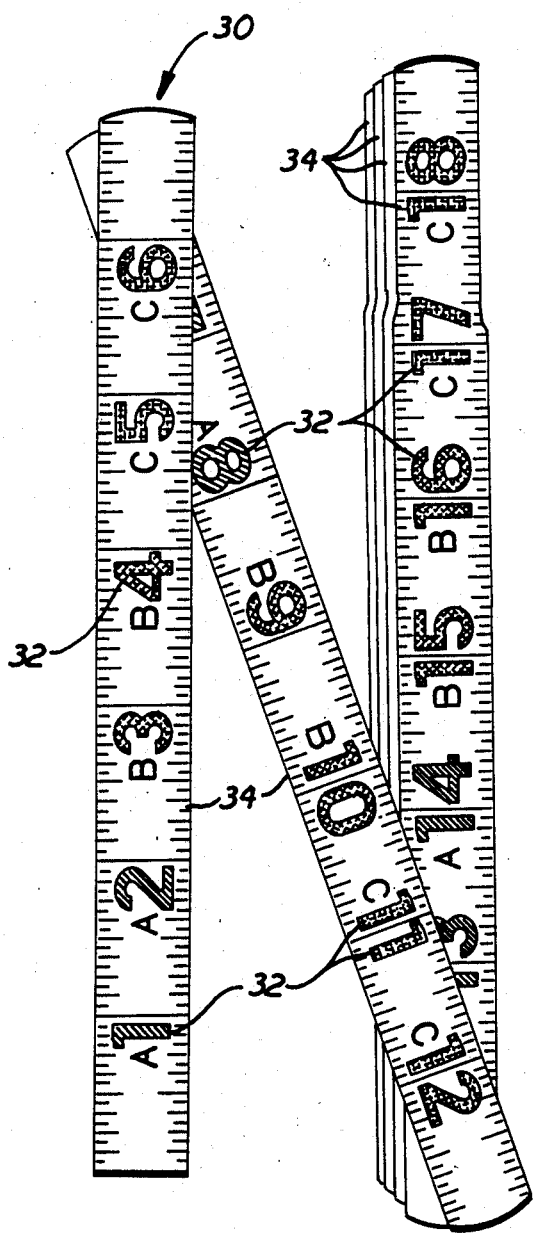
FIG. 2 is a perspective view of the color coded ruler of the invention in which the sequential numerals of the ruler are color-coded to respectively correspond to the color of each numbered pole of a conventional three-phase panelboard.
Figure 3:
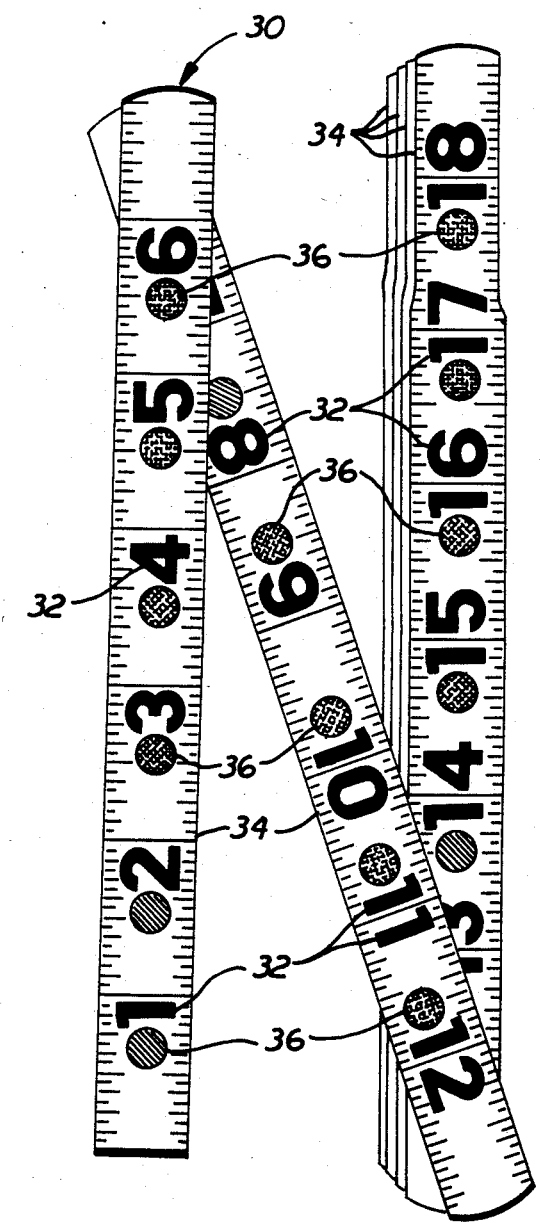
FIG. 3 is a perspective view of another embodiment of the color-coded ruler of the invention in which color-coded indicia are imprinted adjacent to the numerals of the ruler to respectively correspond to the color of each numbered pole of a conventional three-phase panelboard.

Referring now to FIGS. 2 and 3, the invention comprises a color-coded ruler 30 for electricians to assist the electrician in the wiring of a three-phase panelboard 10. For the purposes of the following discussion and the claims appended hereto, the term "ruler" shall mean and include any conventional ruler whether of the fold-out type as illustrated in FIGS. 2 and 3 or an extensible/retractable ruler in which the ruler element retracts in and winds up on a spool within a housing.

More particularly, the color-coded ruler 30 of the invention comprises a series of increasingly sequential numerals 32 imprinted on the ruler element 34 in a predetermined increment e.g. one inch, one centimeter, etc. Each increment may be further subdivided to represent fractional amounts of the increment. As illustrated in FIG. 2, the numerals 32 are color-coded to correspond to the color scheme of each sequentially numbered pole 22 of the panelboard 10. Specifically, numerals 1 and 2 are color-coded brown to correspond to the desired brown color of the conductor connected to the first and second numbered poles 22 of the panelboard 10. Likewise, numerals 3 and 4 are colored orange to correspond to the desired color of the conductors connected to the third and fourth numbered pole 22 of the panelboard 10. Finally, numerals 5 and 6 are colored yellow to correspond to the desired yellow color of the conductor connected to the fifth and sixth numbered pole 22 of the panelboard 10. This pattern is then repeated for all subsequent numerals 32 imprinted on the ruler element 34 up to the total number of numbered poles 22 of the panelboard 10. For example, in the United States, where all lighting and appliance panelboards 10 are required to not exceed forty-two numbered poles 22, the color-coded ruler 30 of the invention would have numerals 1-42 color-coded in accordance with the above described pattern. However, for ease in manufacturing, all of the numerals 32 of the ruler element 34 may be color-coded without departing from the spirit and scope of the invention.

FIG. 3 illustrates an alternative embodiment of the color-coded ruler 30 in which other indicia 36 are imprinted on the ruler element 34 and colored with the above described color pattern corresponding to each numbered pole 22 of the panelboard 10. Consequently, in this embodiment, a brown colored indicia 36 would be imprinted on the ruler element 34 adjacent to numerals 1 and 2, 7 and 8, 13 and 14, etc.; an orange colored indicia 36 adjacent to numerals 3 and 4, 9 and 10, 15 and 16, etc.; and, a yellow colored indicia 36 imprinted adjacent to numerals 5 and 6, 10 and 11 and 17 and 18, etc. Hence, this alternative embodiment of FIG. 3 functions in basically the same manner as the embodiment of FIG. 2 to indicate the desired color of the conductor for each numbered pole 22 of the panelboard 10.

Finally, as a further aid to the electrician, each phase of the intended wiring may be imprinted adjacent to each numeral 32 on the ruler element 34 to quickly indicate to the electrician the proper phase (phase A, B or C) corresponding to each color. Hence, as illustrated in FIG. 2, the letter "A" is imprinted adjacent to numerals 1 and 2, 7 and 8, 13 and 14, etc.; the letter "B" is imprinted adjacent to numerals 3 and 4, 9 and 10 and 15 and 16, etc.; and the letter "C" adjacent to numerals 5 and 6, 11 and 12, and 17 and 18, etc.

From the foregoing, it should be readily apparent that both embodiments of the color-coded ruler 30 of the invention assist an electrician in the wiring of a panelboard 10 with the appropriately colored conductors in accordance with applicable governmental regulations. Indeed, it is readily apparent that any color scheme may be imprinted on the ruler element 34 without departing from the spirit and scope of the invention. For example, the color scheme of black/red/blue commonly used to identify conductors of lower voltage three-phase circuits could easily be imprinted on the ruler element 34 in the manner described above. Moreover, the ruler element 34 may have printed on one side one particular color scheme and, on its other side, another color scheme to increase the versatility and use to identify conductors of two different color schemes.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. An electrician's color-coded ruler for identifying the wiring pattern of the three desired colors of the wire conductors to be connected to the respective phases of sequentially numbered poles of a three-phase panelboard, the ruler including sequentially numbered numerals each colored in one of the three desired colors corresponding, in a repeating pattern, to the sequentially numbered poles of the three-phase panelboard, the pattern defined as the first two numerals and numbered poles corresponding to the first desired color, the successive two numerals and numbered poles corresponding to the second desired color and the successive two numerals and numbered poles corresponding to the third desired color.

2. The color-coded ruler as set forth in claim 1, wherein said three colors comprise colors black, red and blue, respectively, to correspond to the three phases of the panelboard.

3. The color-coded ruler as set forth in claim 1, wherein said three colors comprise the colors brown, orange and yellow, respectively, to correspond to the three phases of the panelboard.

4. An electrician's color-coded ruler for identifying the wiring pattern of the three desired colors of the wire conductors to be connected to the respective phases of sequentially numbered poles of a three-phase panelboard, the ruler including sequentially numbered numerals, each having colored indicia imprinted adjacent thereto, each said indicia colored in one of the three desired colors corresponding, in a repeating pattern, to the sequentially numbered poles of the three-phase panelboard, the pattern defined as the first two indicia and numbered poles corresponding to the first-desired color, the successive two indicia and numbered poles corresponding to the second desired color and the successive two indicia and numbered poles corresponding to the third desired color.

5. The color-coded ruler as set forth in claim 4, wherein said three colors comprise colors black, red and blue, respectively, to correspond to the three phases of the panelboard.

6. The color-coded ruler as set forth in claim 4, wherein said three colors comprise the colors brown, orange and yellow, respectively, to correspond to the three phases of the panelboard.

* * * * *